W. W. BALL.
Wheel Hub.
No. 77,568. Patented May 5, 1868.
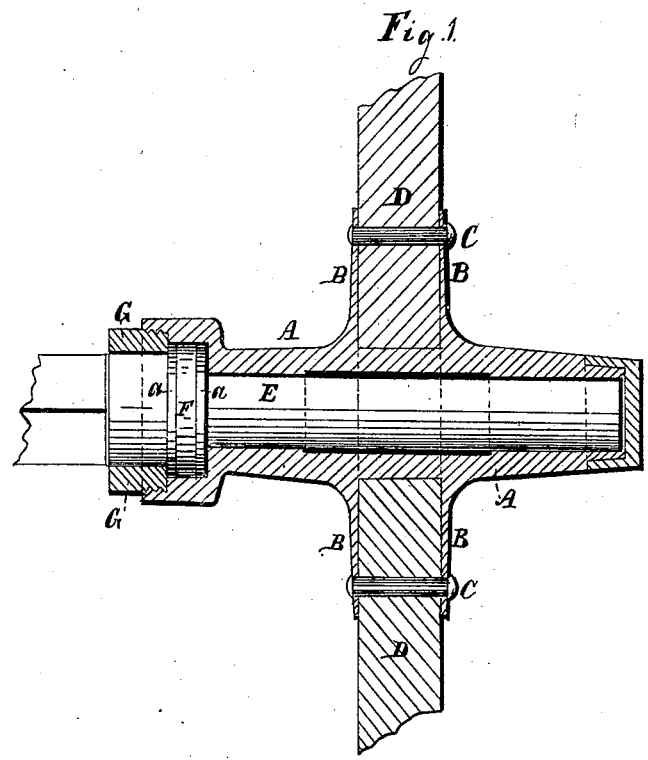
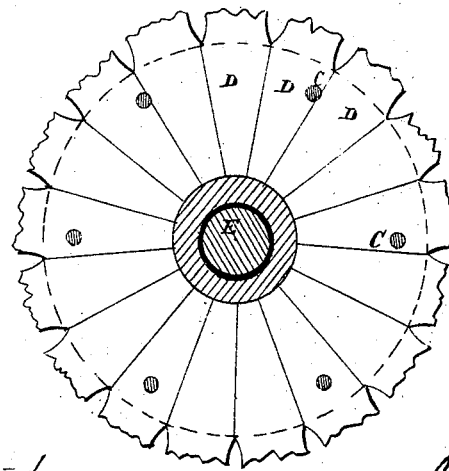

United States Patent Office.

WILLIAM W. BALL, OF EDINBURG, INDIANA.

Letters Patent No. 77,568, dated May 5, 1868.

IMPROVEMENT IN METAL HUBS.

The Schedule referred to in these Letters Patent and making part of the same.

TO ALL WHOM IT MAY CONCERN:

Be it known that I, WILLIAM W. BALL, of Edinburg, in the county of Johnson, and in the State of Indiana, have invented certain new and useful Improvements in Hubs; and do hereby declare that the following is a full, clear, and exact description thereof, reference being had to the accompanying drawings, and to the letters of reference marked thereon.

In the annexed drawings making part of this specification, A represents a cast-metal hub, all in one piece, and with either a closed or open outer end, as may be desirable.

The opening in this hub answers as a box for the skein of the axle. Upon the centre of the outside of the hub are cast two flanges, B, a suitable distance apart to receive the large or butt-ends of the spokes D. These flanges are annular, and at the same time tapering in shape, being larger at their bases, or where they leave the body of the hub, than at their edges. These flanges are made of such thickness that they may be sprung toward each other and lightly against the spokes, by means of suitable bolts, which pass through them.

D D represent the spokes, which are so formed at their inner ends that they meet and form a self-supporting centre, although their inner ends may also rest upon the metal of the hub between the flanges.

Bolts C C pass through the flanges B B, and between the spokes, and nuts upon one end of said bolts may be made to draw the flanges tightly against the spokes, or the said flanges may be pressed up by other means, and then the bolts headed at both ends.

The spokes are thus held firmly in their places. Should any space at any time be made by shrinkage or other means between the spokes, I may drive in suitable wedges to tighten them. Two recesses are formed in the inner end of the hub, one to receive the collar F of the arm of the axle, and the other to receive the nut which confines the hub to the axle. Washers $a$ $a$ are used upon each side of collar F, as represented, to prevent wear, or to prevent noise in case of wear.

G represents the nut which holds the hub upon the arm. This nut has a thread cut upon its periphery or outside, which corresponds with a thread in the recess of the hub which receives the nut. The nuts are placed upon the arms before said arms are welded to the axle.

The inner end of the nut bears against the outer washer. By cutting the outer washer in two, it may be placed over the arm, and thus a new one supplied at any time. This arrangement of washers prevents any escape of oil from the hub

What I claim, is—

The annular flanges B B, made tapering from the hub to their edges, and cast of one piece with the hub, in such a manner as to form springs that are contractible, and made to firmly secure the spokes by the bolts C, as specified.

In testimony that I claim the foregoing, I have hereunto set my hand, this 27th day of February, 1868.

WILLIAM W. BALL.

Witnesses:
   JAS. M. HODGEN,
   CURTIS L. DAVIS.